(133.)
THOMAS SNOW.
Improvement in Seed Planters.
No. 122,412. Patented Jan. 2, 1872.
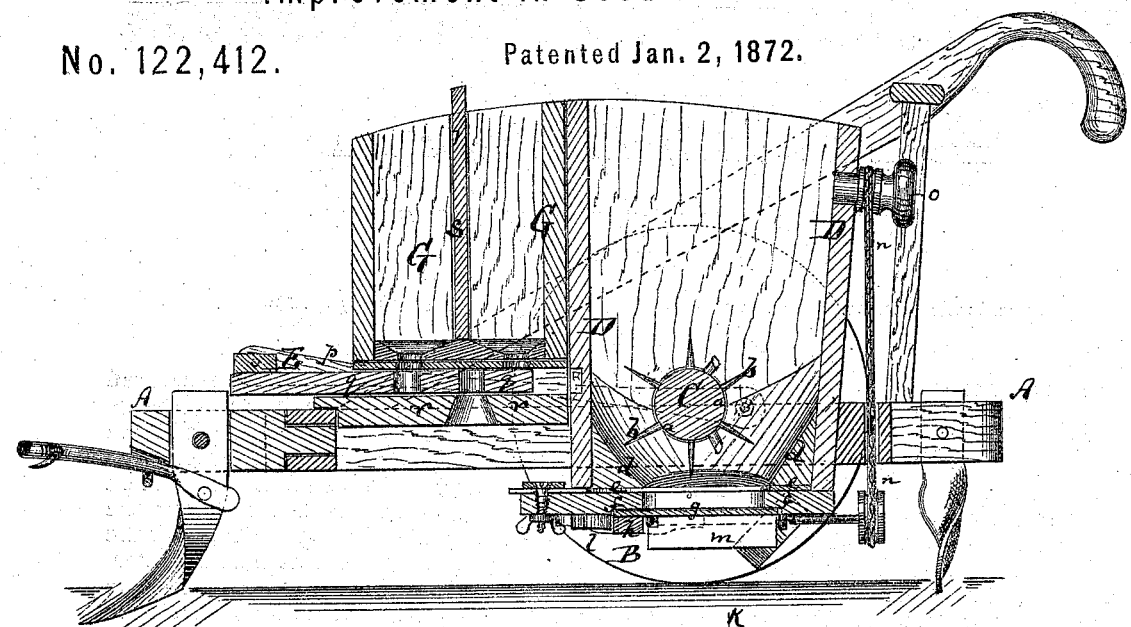
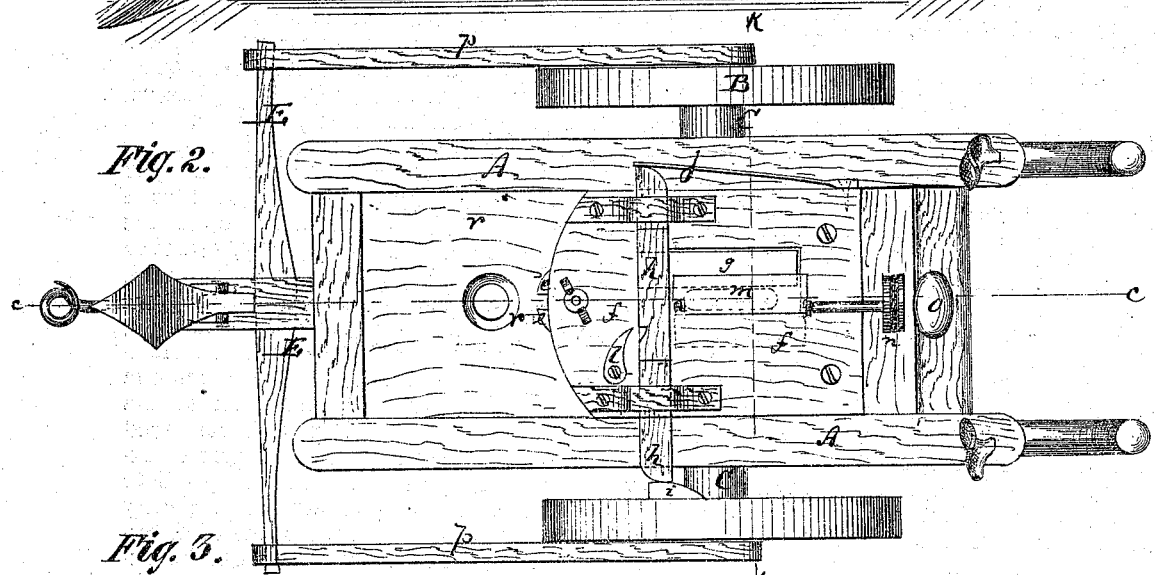
Fig. 2.
Fig. 3.
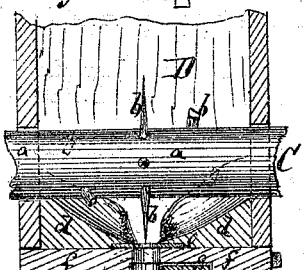
Witnesses.
P. C. Dieterich
Francis McArdle.
Inventor:
Thos. Snow
Per Munn & Co.
Attorneys.
AM. PHOTO-LITHOGRAPHIC CO. N.Y. (OSBORNE'S PROCESS.)

ID No. 122,412

UNITED STATES PATENT OFFICE.

THOMAS SNOW, OF SOCIAL CIRCLE, GEORGIA.

IMPROVEMENT IN SEED-PLANTERS.

Specification forming part of Letters Patent No. 122,412, dated January 2, 1872.

*To whom it may concern:*

Be it known that I, THOMAS SNOW, of Social Circle, in the county of Walton and State of Georgia, have invented a new and Improved Cotton, Corn, and Seed Planter, Guano-Spreader, &c.; and I do hereby declare that the following is a full, clear, and exact description thereof, which will enable others skilled in the art to make and use the same, reference being had to the accompanying drawing forming part of this specification.

Figure 1 represents a vertical longitudinal section of my improved planter, seeder, and spreader taken on the line $c\ c$, Fig. 2. Fig. 2 is an inverted plan view of the same. Fig. 3 is a vertical transverse section of the same taken on the plane of the line $k\ k$, Fig. 2.

Similar letters of reference indicate corresponding parts.

My invention consists in the improvement of cotton-seed planters and guano-spreaders, as hereinafter fully described and subsequently pointed out in the claim.

A in the drawing represents the frame of my improved machine, supported by wheels B B, which are mounted upon a rotary axle, C. The axle carries a drum, $a$, within the lower part of the hopper D, said drum having projecting spikes $b\ b$, so arranged as to properly disturb the contents of the hopper and prevent their clogging. The bottom of the hopper is made to converge to a narrow opening by the insertion of two concave-faced blocks, $d$, in its corners. These blocks afford no resting place for any seed in the corners or other places, and cause the seed consequently to slide to the discharge opening. Under the bottom of the hopper D is placed a slotted metal plate, $e$, which is lengthwise adjustable so as to vary the length of discharge opening at will. Under this there is a wooden bottom, $f$, slotted to permit the discharge of the seed. The opening through the plate $f$ is alternately opened and closed by a slide-plate, $g$, secured to a sliding cross-bar, $h$. This bar receives reciprocating motion by a cam, $i$, on one of the wheels B, and by a spring, $j$. Thus once at every revolution of the wheel B, or, if there are more cams $i$ than one, as much oftener, the valve $g$ or slide-plate is drawn from under the opening in the plate $f$ and lets the seed drop. The bar $h$ can be locked by a pawl, $l$, so as to leave the plate $g$ withdrawn from under the discharge opening. This is done if the operator chooses to regulate the discharge of seed by hand. For this purpose a vibrating plate, $m$, is arranged under the plate $f$, and its pivot connected by a band, $n$, with a turn-handle, $o$. By means of the latter the driver can open and close the opening in $f$ at will, and have the seed dropped wherever required. By means of connecting-rods $p\ p$ the wheels B serve also to impart reciprocating motion to a frame, E, which contains a seed-slide, $q$, under a hopper, G. This hopper has two discharge openings, under which apertures in the slide $q$ are alternately brought. There is, however, but one discharge opening in the plate $r$ under the slide $q$. Suitable material may be conveyed from the hopper G to the ground. $s$ is a transverse partition, placed into the hopper G to transform it into two hoppers, as is clearly shown in Fig. 1. In this case seeds of different kinds, such as corn and peas, can be discharged from the two hoppers and planted in alternate hills.

Having thus described my invention, I claim as new and desire to secure by Letters Patent—

The vibrating plate $m$, combined with the band $n$ and turn-handle $o$, substantially as specified.

THOMAS SNOW.

Witnesses:
J. R. MOBLEY,
W. S. CARTER,
A. N. COLTON, *N. P.*

(133)